(12) United States Patent
Natividad

(10) Patent No.: US 10,171,454 B2
(45) Date of Patent: *Jan. 1, 2019

(54) METHOD FOR PRODUCING DYNAMIC DATA STRUCTURES FOR AUTHENTICATION AND/OR PASSWORD IDENTIFICATION

(71) Applicant: Alejandro V. Natividad, Amarillo, TX (US)

(72) Inventor: Alejandro V. Natividad, Amarillo, TX (US)

(*) Notice: Subject to any disclaimer, the term of this patent is extended or adjusted under 35 U.S.C. 154(b) by 50 days.

This patent is subject to a terminal disclaimer.

(21) Appl. No.: 15/237,573

(22) Filed: Aug. 15, 2016

(65) Prior Publication Data

US 2016/0359839 A1 Dec. 8, 2016

Related U.S. Application Data

(63) Continuation-in-part of application No. 14/462,435, filed on Aug. 18, 2014, now Pat. No. 9,419,966, which is a continuation-in-part of application No. 13/593,287, filed on Aug. 23, 2012, now Pat. No. 8,813,219.

(51) Int. Cl.
| | |
|---|---|
| *H04L 29/06* | (2006.01) |
| *G06F 3/0484* | (2013.01) |
| *G06F 17/30* | (2006.01) |
| *G06F 21/31* | (2013.01) |
| *G06F 21/36* | (2013.01) |
| *G06F 21/45* | (2013.01) |
| *H04L 9/32* | (2006.01) |
| *H04W 12/06* | (2009.01) |
| *H04W 4/12* | (2009.01) |

(52) U.S. Cl.
CPC .......... *H04L 63/083* (2013.01); *G06F 3/0484* (2013.01); *G06F 17/30657* (2013.01); *G06F 21/31* (2013.01); *G06F 21/36* (2013.01); *G06F 21/45* (2013.01); *H04L 9/3226* (2013.01); *H04L 9/3228* (2013.01); *H04W 12/06* (2013.01); *H04L 63/18* (2013.01); *H04W 4/12* (2013.01)

(58) Field of Classification Search
CPC ......... G09G 5/00; G06F 17/30; G06F 3/0484; G06F 21/31; G06F 21/45; G06F 21/36; H04L 9/32; H04L 63/083
USPC ......... 726/2, 4, 5, 6, 7, 10, 17, 18; 713/156, 713/186; 345/713
See application file for complete search history.

(56) References Cited

U.S. PATENT DOCUMENTS

| | | | | |
|---|---|---|---|---|
| 8,510,811 | B2* | 8/2013 | Kuang | ................ H04L 63/0869 713/156 |
| 2013/0212674 | A1* | 8/2013 | Boger | .................... G06F 21/36 726/17 |

* cited by examiner

*Primary Examiner* — Thanhnga B Truong
(74) *Attorney, Agent, or Firm* — Donn K. Harms

(57) ABSTRACT

A method for generating a changing authentication input or password generation input for a user is provided. The method allows access to a computing device such as a smartphone or computer or using the computing device to communicate over a network to a server. Using recognizable objects displayed in positions on a graphic display, and input strings of text or alphanumeric characters the user has identified as related information relating to each recognizable object, a password or authentication can be generated by combining the input strings relating recognizable objects to paired related objects. Authentication can be varied easily for each access attempt by changing the recognizable objects displayed and/or the sequence of responses.

13 Claims, 9 Drawing Sheets

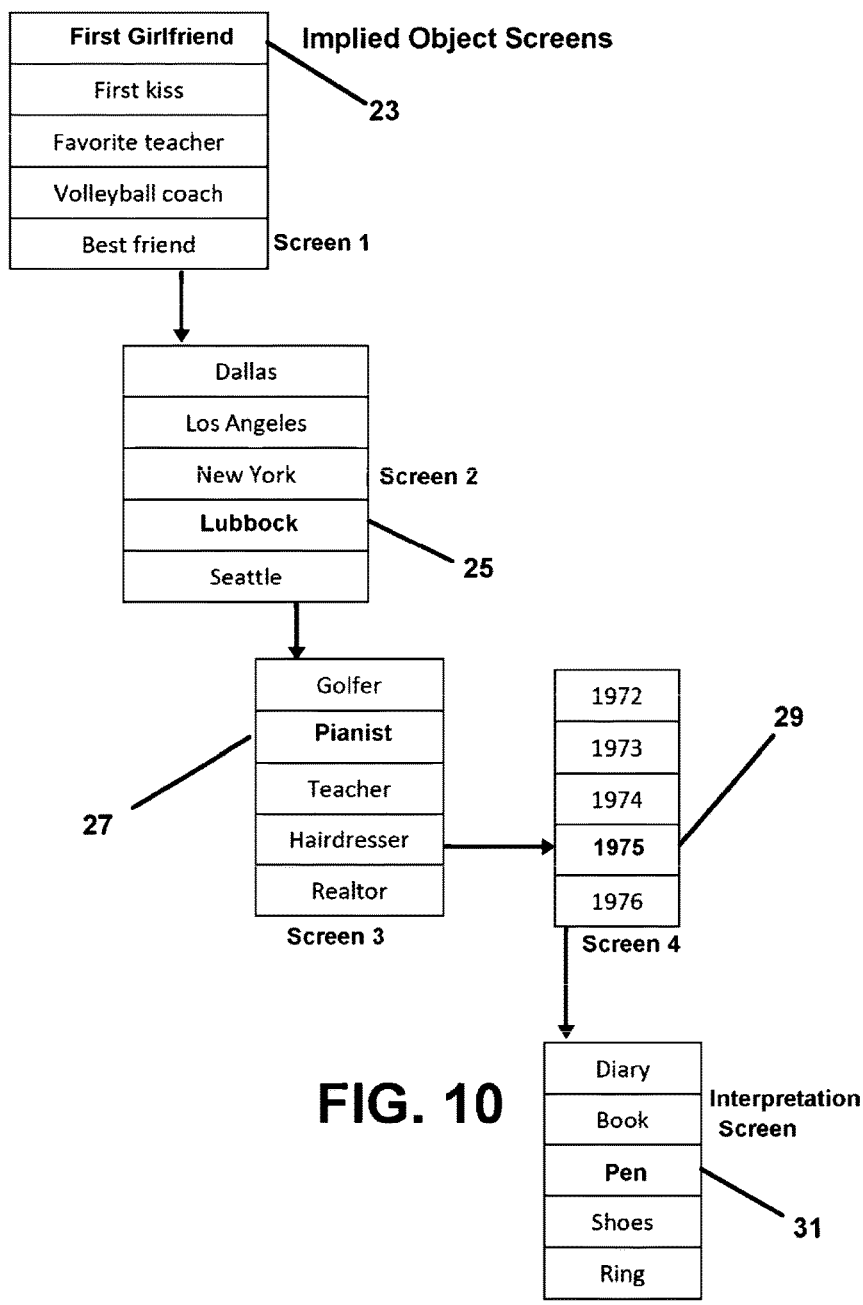

Previously Entered Static Code

| an031058 |
|---|

Create and Enter Your Access Code Using One of the Following:

| Generate an Access Code using One of the Following: |
|---|
| 1. 1st and last letter of Recognized Object added to opposite ends of Static Code. |
| 2. 1st two letters of Recognized Object added to end of Static Code. |
| 3. Last two letters of Recognized Object added to beginning of Static Code. |
| 4. Second Letter from the Beginning of Recognized Object added to beginning of static code and second letter from the end of the Recognized Object added to end. |

Single-Use Code Created by using option 2:

Access Code using JULIE GOMEZ AS AN EXAMPLE:

Static Code: (an031058)

Plus Secret code (ju) *using option 2 above the answer would be:

| an031058ju |
|---|

FIG. 12

METHOD FOR PRODUCING DYNAMIC DATA STRUCTURES FOR AUTHENTICATION AND/OR PASSWORD IDENTIFICATION

This application is a Continuation-in-Part to U.S. patent application Ser. No. 14/462,435 filed on Aug. 18, 2014 which was a Continuation-in-Part application to U.S. patent application Ser. No. 13/593,287 filed on Aug. 23, 2012.

BACKGROUND OF THE INVENTION

1. Field of the Invention

The present invention relates to information technologies. More particularly, the invention relates to a method for producing a data structure for password identification employing a dynamic graphic user interface.

2. Prior Art

In recent years more individuals have begun to rely on technologies such as personal computers, smart phones, tablets, and other devices in work as well as in their personal lives. Many of these individuals maintain personal information stored in these devices including addresses, passwords, emails, phone numbers, bank accounts, credit cards, social security numbers, family and friends information, and the like.

It is conventionally known that these electronic devices can require a password identification to allow the user access to the device and to the data stored within or accessible thereby. This password requirement is most commonly encountered by the user on the 'logging in' screen of the devices, which occurs during the initial boot up of the software of the device. However, for added security, many individuals will also password protect select files, emails, and other desired information which should be confidential.

The reason for password protection is quite simple in that the device the owner wishes to prevent an intruder, such as a third party hacker, thief, or the like, from gaining access to a device and obtaining personal information or access to confidential or personal information which the access to the device may provide. Otherwise, with the appropriate information gleaned from such an encounter, an intruder can assume the device owner's identity online.

Identity theft and computer fraud, thus, is one major concern, since a hacker or thief who obtains access to a computing device providing access to the owner's personal information such as a credit card number or social security number, can immediately begin charging to a credit card or open a new and fraudulent credit line. Password protection of selected files and electronic directories, and/or accessible files or information, and of the device itself, is an owner's attempt to prevent such crimes from happening.

However, password protection is conventionally limited to a single data string input, such as alphanumeric characters, symbols, numbers, and combinations thereof. The user or device owner is required to remember that data string in order to input it correctly and gain access to their device, their email, their protected folder, their network connection, and the like.

Many pitfalls are present with this conventional method. First, the user may have difficulty remembering the password which is a common problem. This forgetfulness can cause a severe problem if the password is required for that user to access their device, or achieve access to a remote website. In such cases the user must navigate through tedious steps for obtaining a new password which conventionally involves answering personal questions, and inputting other personal data over the network or into the device, to authenticate and validate their identity.

As a result, in order to avoid this re-validation process, some individuals will choose passwords which are easy to remember and simple in nature. This of course provides minimal protection against theft, and frequently such easy passwords can be discerned by a smart thief who surveys the user's FACEBOOK page which is known to publish personal information about the user.

An additional pitfall is that single data string passwords can easily be captured during transmission on the network, or otherwise discovered by third party hackers with computer abilities, or with research and trial and error input. Once a user's password is obtained, all personal information for the user will be at an unauthorized party's fingertips as well as any other sensitive information the user's device may access. Hackers are getting better at obtaining personal information, especially on unprotected wireless networks as is often provided in popular public places like cafes, restaurants, and the like. Or as noted, hackers are known to ascertain passwords and the like for users by surveying a user's FACEBOOK page, or a similar social network page, where the user may have unwittingly posted the password to remember it, or information such as their kid's names, or dog's name, or birthday, which would lead to a guessing of the password.

Still further, some users who are more security conscious may continuously change their passwords. Although this method may help to keep a hacker or thief at bay, it of course may lead the user to forgetting the changed password and having to go through the noted tedious steps of proving their identification. As one can discern, in an era of ever-faster networks and hotspots, and network eavesdropping software with easy access by multiple users, the task of personal information security is becoming more daunting than it should be.

As such, there is a continuing unmet need for a method employing software adapted at the task, of producing a data structure or string for password identification, which will provide security, but also provide only specific individual users with the ability to use it, and to more easily remember or discern their password. Such a system should endeavor to employ a continuously changing, user-viewable, graphic user interface (GUI) as a means for identifying the user as authorized and/or their password and/or changing their password, and providing a means for the user to identify their changed authorization. Such a method should produce a different required data structure (password) personal only to each user, at each authentication session (i.e. log in), thereby allowing the user to employ this dynamically changing GUI, to determine the current password based upon pre-defined code criteria, and/or to act as the interface for communication of the appropriate password information to the system requiring it. Such a system should provide a means for generating or requiring ever changing passwords for users which can only be determined by the user's predefined criteria, and because the password or GUI is so personal to the user, concurrently render hackers and identity thieves alike unable to obtain user information. Such a method should also employ broadcast communication encryption.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art and achieves the above noted goals through the provision of a method for password or user identification for a user attempting entry to a device or computer system. The system, employing software running on a microprocessor such as a server, and communicating over a network, is configured to the task of providing each individual user with a dynamically changing GUI, personal to that user, and thereby indiscernible by third parties. Generation of the changing GUI is provided through following a set of pre-defined user-criteria for generating a communicated data string representing a password, which is personal in input determination such that it can only be determined by the user who set the original criteria.

In accordance with a first preferred mode, the GUI is provided in a sequence based on inputs from a grid, or a matrix of dynamically positional user-viewable objects, and/or one or a plurality of sounds, broadcast to the hearing of the user. The user pre-defines the set of viewable objects and/or sounds, but not the position of the objects on the GUI nor the timing of the communication of sounds to their ears. The objects can be one or combination of objects, from a group of objects consisting of pictures, images, phrases, questions, numbers, colors, colored numbers, and/or sounds, and the like, which are embedded into the background of a display screen presented the user as the objects, or communicated to the user concurrently with the display screen as sounds.

In combination with the plurality of objects, or sounds, the user additionally pre-defines a word-association with each respective object or sound communicated and discerned during a login. For example, an object may be a picture of the user's childhood dog, and the associated word for input or matching with indicia on the screen, may be the dog's name "Spot". Or, the object depicted on the login display may be a picture of an elderly woman, preferably the grandmother or another woman probably only known by the user, which may be assigned the word "Granny" for input or matching to indicia on the screen. Or, for instance, a question may be chosen and presented the user on login, and the answer is the associated word which is only known by the user, and so on. Additionally, sounds such as the sound of the user's mother's voice or that of another relative or friend which will easily be recognized by the user on broadcast of the sound, thereby allowing the user to input a matching word, or object.

With the plurality of objects and/or sounds which are chosen by and therefor easily remembered by the user, when a password or security input is required for access to a device or system, the GUI is communicated and displayed to the user displaying a sequence of the objects, a grid (i.e. X-Y grid), or a matrix with the objects randomly positioned at various locations of the depicted GUI, or along with one or a plurality of sounds which may play upon input to play such, or as an identifier by oral object for the user to identify. Thus, pictures, photos, and sounds, displayable to the user and personal only to each user, are placed into a database for communication to the user on screen or by auditory means, in subsequent logins.

Prior to such subsequent logins, the user may also pre-define the sequence or pattern criteria for their subsequent selecting of the objects positioned on the GUI or sounds communicated during display of the GUI, and a subsequent inputting of text associated with each, or a subsequent matching of objects or sounds to displayed icons, photos, drawings, or text, which when read or seen by the user, matches.

By employing this pattern, and a means for visually determining the objects or determining sounds through auditory means, a number of which may sequentially correspond to the user-known pattern displayed on the GUI, an authentication password string or pattern is determined. The password or authorization string is determined by the user typing the corresponding dynamic word string defined by the user's pre-defined words which are associated with the viewed objects in that particular sequence. Or by a drag and drop method of matching displayed objects to displayed text or a matching of displayed objects with predetermined secondary objects, or by a matching of an icon or displayed object associated with a played sound, to a displayed object or word. For instance a sound is playable by a user clicking on a phonograph icon, that sound being their mother's voice. Thereafter the user would drag the icon associated with the sound that played to a communication with an object being a photo or rendition of their mother.

Software adapted to the task, monitoring user text inputs and graphic actions, would discern this drag and drop, and using randomly associated numbers or codes preassigned that day, to each of the sound icon and the mother's picture, would generate an authentication string, and communicate it to the device, or over the network for network access. Software adapted to the task of matching the authentication string, to one or more strings based on the randomly assigned strings to each sound and object communicated that day, and temporarily stored in memory, will ascertain if a proper password string is communicated by the user's actions in identifying the objects and/or sounds using textual or graphic matching inputs or combinations thereof.

As a simple example, the GUI may be a simple sequence of three objects positioned in a row. The user first defines their preferred code criteria. For the code criteria, the user selects a plurality such as three images well known to the user and assigns word associations for each which they can easily remember. The user causes matching words, or graphic associations, to be associated with the images or objects or sounds, to be stored in a relational database.

In this example, IMAGE-1 is a picture of the user's mother, and the assigned WORD-1 is "mom", IMAGE-2 is a picture of the ocean and the WORD-2 is "vacation", and IMAGE-3 is a picture of a dog and the WORD-3 is the dog's name known to the users as "spot". It is particularly preferred that the images and word associations are personal to the individual user and not something that could easily be determined by a hacker or thief. For example, the image of the ocean may mean something very different to other people, but in this particular example it is a picture of the beach taken in a past vacation, thus, the word "vacation" is chosen. Alternatively, a sound of the user's mother's voice, or grandmother's voice, could be communicated and matched with the term "mom".

For this simple example, the objects in the GUI will be presented in a row of 3 objects, therefor there are three positions available in the displayed GUI, POSITION-1, POSITION-2, and POSITION-3 (counting left to right). The user and/or server selects a pattern of which the objects will be selected to define the password, and this pattern is made known to the user. Here we will arbitrarily choose the pattern of POSITION-2, POSITION-1, and POSITION-3. Thus far the user has defined all the criteria.

The operative employment of the example of the method herein would proceed as follows. The user upon starting their computer or at a login to a website, is presented with an authentication prompt or graphic user interface, (i.e. Log in page for a personal computer, email account, bank account, network access etc.) In this prompt a displayed GUI and a password input bar is presented to the user. The software running the system, or the server the system is attempting to access, will randomly position three from a plurality of pre-associated objects, or sounds with related objects, stored in the database (in this case IMAGE 1 through 3) in a row and display it to the user. For this example, the displayed GUI using software adapted to the task at POSITION-1 shows IMAGE-3, at POSITION-2 shows IMAGE-1, and at POSITION-3 shows IMAGE-2.

Now, using the associated words for each object or image displayed or sound transmitted and heard, known only to the user, the password will always be defined by the dynamic word string consisting of a sequential string of those associated words from the group of associated words and objects in the database. The input words for each respective displayed objects will be typed using the user-associated words sequentially using the known and pre-determined pattern of selection. Alternatively, icons or objects, having text or graphics discernable by the user, and matching the text or words the user defines to identify the objects are displayed. The user will drag and drop, to mate the objects with the icons or objects matching them and known to the user to input the string.

Again, in this example the authentication pattern is POSITION-2, POSITION-1, and POSITION-3. Therefor, the password is the word string constructed from the words associated from the images in the above positional pattern, in this case IMAGE-1, IMAGE-3, and IMAGE-2. Therefor the word string for this password is "momspotvacation". The associated words are easily remembered by the user since the objects are photos or pictures of a very dear person, a fondly remembered place, and a pet. The user inputs this string into the password input window in the correct sequence, and authentication is verified by software adapted to compare the input words in the input sequence to the stored images and objects in the relational database. Since the sequence is known to the user and the words easily remembered, a correct string of words is generated and the user is allowed access.

Upon ending the authenticated session (i.e. logging out, turning off the device, etc.) the system employing software adapted to the task, then forgets the previously input password, and upon another authentication attempt (i.e logging back in) the objects or images depicted in the GUI presented to the user may either be different from a group larger than the number of image spots, or at least displayed in a different order.

Using the predetermined sequence for input and the objects or images placed in the three positions, software adapted to the task will then determine a correct new password based on the newly ordered objects or images positioned in the GUI. Thereafter, employing the same known sequence for the authentication pattern, the user can easily determine the correct word string for input of a totally different password.

In an alternative but especially preferred mode of the system, the known objects and known sounds along with other sounds and objects, are communicated to the user device for display and sound, from a server storing such for the system as originally provided by user choice and identification.

In the communication upon initiation of a login by the user, with each object, picture, sound, or other indicia or displayed material communicated by the server to the user device, a random code or string is also associated. The association and random strings are also temporarily stored in memory on the server. When the user, during login, makes the appropriate match of object and sound to user pre-identified indicia or matching object or other matching input in the GUI, the random strings of code or text communicated as associated with the objects and sounds, are combined and re-communicated back to the server. The random matched strings of text or code are compared to the temporary stored matched strings in memory, and if correct, access is provided. In this mode, the strings of code or text which are communicated are always random, and never the same on a subsequent visit. Thus, a hacker or third party monitoring the user input or communications across the network, will never be able to capture reusable strings and string matches, since on every subsequent visit, new strings of code or text are associated with each object and sound communicated to the GUI login of the user, and any prior captured login information will be useless.

This mode of the system, using randomly assigned code, text, or other transmittable identifiers, is especially preferred since there is no actual user input of text or code required, just a matching of symbols or objects or icons or such on their GUI to the pictures or sounds or depictions of people or memories only known to the individual user is required to communicated matching random code or text or other identifiers associated with user matches.

Continuing the example for a user in the above second instance, in this second instance the depicted objects or images positioned in the sequence in the GUI may now show the user; at POSITION-1 is shown IMAGE-2, at POSITION-2 is shown IMAGE-3, and at POSITION-3 is shown IMAGE-1. Therefor, the password set by the system, and determined by the user using the known authentication pattern or sequence, will be "spotvacationmom", or in the case of randomly assigned identifiers for the pattern matching a string of random text, or numbers, or other transmittable identifiers will be communicated and compared to a temporarily stored version of the same to ascertain match.

Again, in all modes, the images or objects or sounds or other displayable or broadcastable objects or sounds communicated to the GUI of the user, are known well to the user and not easily forgotten. However, for most third parties, such would be unknown, and even to friends and family, some of the objects or sounds can be such they would be unable to easily discern a proper match either.

One skilled in the art will realize that the complexity of the system and therefor difficulty for a hacker to determine the password can be increased by many factors. First, the total number of objects stored in group for a user in the relational database can be increased. Since the objects are preferably images of people or things well known to the user, the number of images or objects can be very large, and each associated to the word to that respective image causes the user to easily remember. This word association provides an advantage over prior art as it is solely known to the user and preferably uses images or objects which are easily remembered by the user but would be virtually unknown to strangers.

Additionally, the GUI may present a longer sequence of objects, or sounds, or a grid of objects, or a matrix of objects and/or interlaced sounds, and/or some changing in the sequence used for input for the grid or matrix. All can either have user input identifiers and communicated strings of text or code or may be matched with randomly generated strings by the software adapted to the task, as noted above. As such the authentication pattern can be one of an infinite number of patterns using an extremely large number of objects chosen specifically by the user. Further, the authentication pattern itself can be selectively changed by the user with each authentication process, or by the system using randomly assigned identifiers or strings or code to sounds and objects to be matched, which can still provide the user an easily discerned clue on proper matches to be communicated from the GUI as to the required sequence for each session input.

Therefor, the method herein provides a user with a dynamic rendering of objects or pictures or sounds in a GUI and sound reproduction devices engaged therewith, which may be viewed, heard, and remembered, and associated with a word or other communicable identifier, for determining a proper user input to function as a password identification based off user-determined and easily remembered memories and personal criteria. The system, when communicating across a network, in addition to assigning random identifiers to objects and sounds, may employ software adapted to the task of data encryption to further prevent hackers from obtaining information during the authentication process. However, even if some input data for a password at one session is discerned through electronic eavesdropping, since the input identifiers of the matching objects and sounds changes with each subsequent session, a stolen input from the user on one occasion acting as a password from one session would be useless on a subsequent session.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

It is an object of this invention to provide a security system for user login which is personalized to the memories of the user and therefor hard to forget for the user and virtually impossible to discern for third parties.

This and other objects of the invention will be brought out in the following part of the specification, wherein detailed description is for the purpose of fully disclosing the invention without placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings:

FIGS. 9-10 depict an authentication process for a user who has previously input user-known relations between objects, sounds, or indicia.

FIG. 12 is an example of generation of a single use access code by a user employing the system per FIG. 11.

DETAILED DESCRIPTION OF THE PREFERRED EMBODIMENTS OF THE INVENTION

The method and system employing software running on a computing device or a server adapted at the task and having input components, visual display components, and network communication components adapted to the task, provides a means for creating a dynamic data structure or 'word strings' matched to displayed familiar objects or projected sounds personalized to users which are employable to generate an authentication or password identification string for transmission in a login during individual sessions of use. The method is especially well suited for employment for access control to personal computers, cell phones, smart phones, networks, websites, and other computing or smart devices which may also operate across a network where a user can conventionally 'log in' prior to gaining access thereto, in a fashion able to protect personal information.

Briefly, the dynamic structure of the correct authentication string, or password, for input to a computing device or server, or other electronically accessible device, at each new session is provided through the employment of a personalized GUI. Software adapted to the task of depicting a sequence, a grid, or a matrix and/or predefined objects and/or sounds, having respective word or transmittable string associations, which are only known to the user and system.

In use in one preferred mode, the user pre-defines a plurality of non textual identifiers which includes objects in a group of objects, and/or sounds in a group of sounds, but not the position of the objects nor the timing of the sounds or positions of icons related thereto and rendered on the GUI. The use of the term objects or sounds herein is not to be considered limiting and can include without limitation any discernable photo, drawing, picture, alphanumeric rendering, sound or depiction of sound or other item which may be rendered by the pixels of a GUI, or broadcast by loudspeakers, in a manner recognizable to a user viewing the GUI or hearing the sounds.

Figure 5:
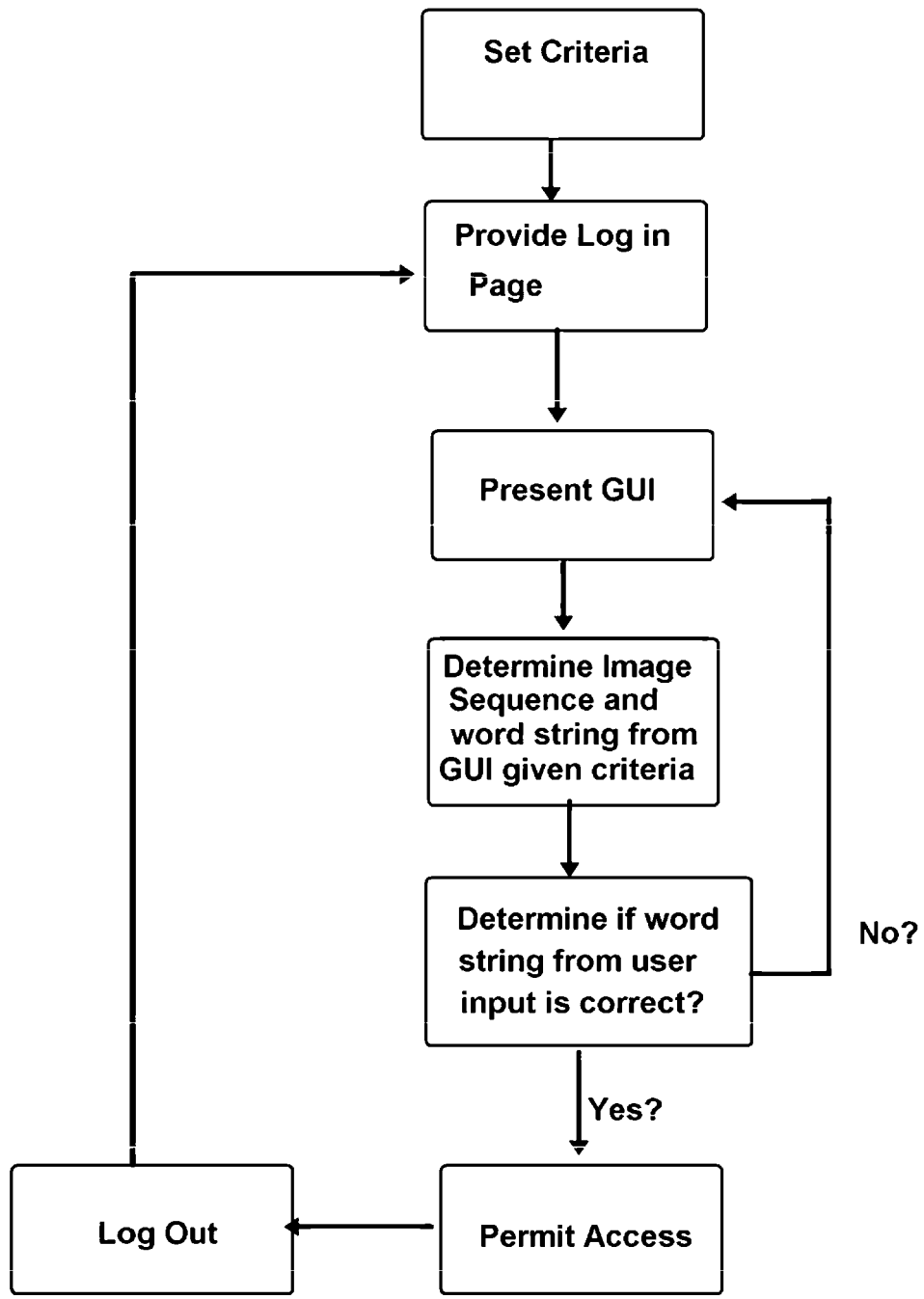
FIG. 5 shows a preferred schematic flow diagram of the dynamic system.
Figure 6:
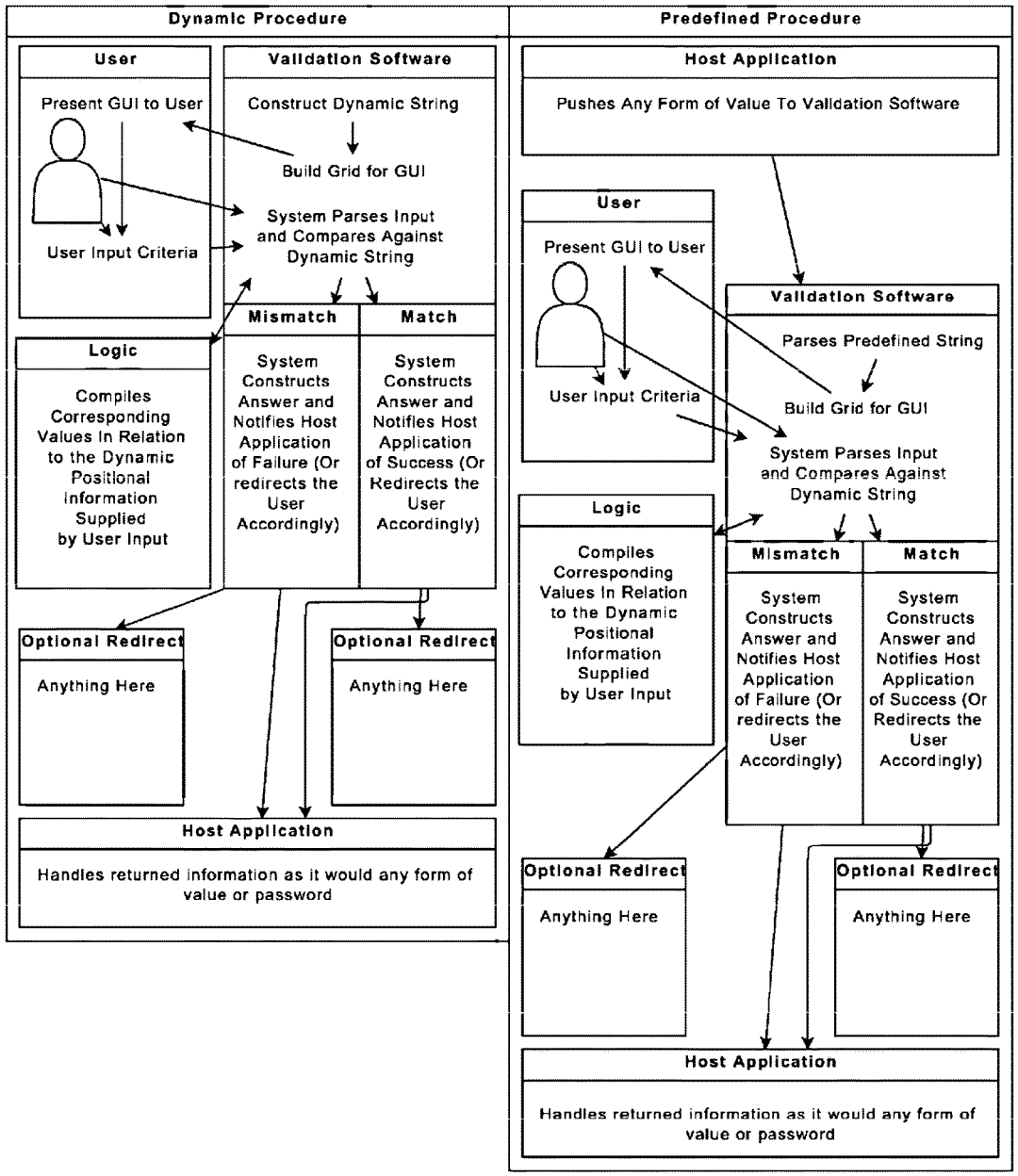
FIG. 6 shows a detailed flow chart of the preferred procedures of the invention.

The objects 16 as used herein, may be any one or a combination of objects, from a group of objects consisting of pictures, photographs, images, drawings, illustrations, phrases, questions, numbers, alphanumeric characters, colors, colorized alphanumeric characters, and the like either rendered in pixels individually or embedded into the background of the rendered objects. Objects as noted may include sounds which may include one or a plurality of sounds recognizable easily by a user such as their mother's voice, their dog's bark, their child speaking, or other highly personalized sounds a user will instantly ascertain and a third party will see as unidentifiable. For each respective picture related object or sound associated with an object, the user additionally pre-defines a word or number string to be associated with each object or sound, or the system assigns a random identifying string of code or text to each individual object or sound. Flow chart and diagram representation of the method herein, are not to be considered limiting, are shown in FIG. 5 and FIG. 6.

It is noted and anticipated that although the invention is shown in the following flow charts and preferred user interface displays in its most simple form, various aspects and features of the disclosed method may be modified when configuring the invention herein. As such those skilled in the art will appreciate the descriptions and depictions set forth in this disclosure or merely meant to portray examples of preferred modes of providing known object depictions to users for input of known text strings, within the overall scope and intent of the invention, and are not to be considered limiting in any manner.

Figure 1:
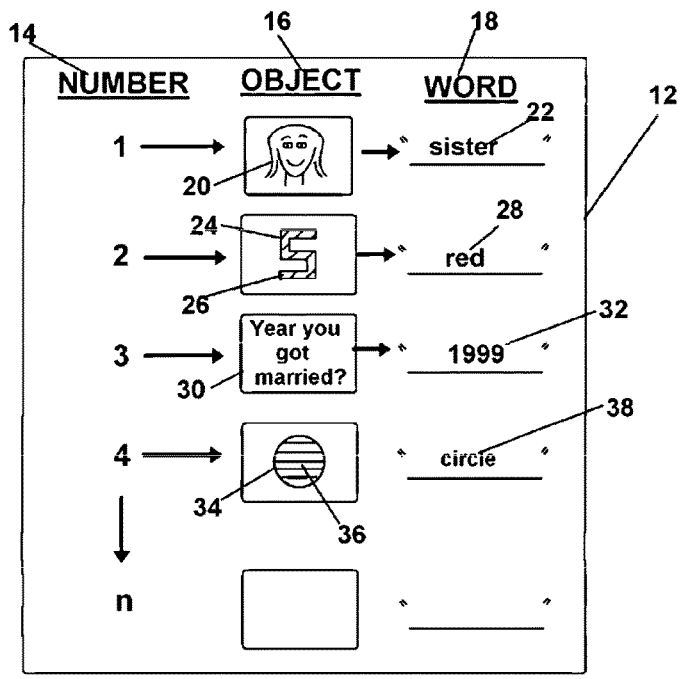
FIG. 1 shows a view of a preferred interface wherein a user inputs system criteria comprising recognized objects (images, phrases, pictures, sounds, etc.) and a word or string of communicable code or text associated with each.

Now referring to drawings in FIGS. 1-12, wherein similar components or steps are identified by like reference numerals, there is seen in FIG. 1 a view of a preferred GUI or personalized user interface window 12, of the system 10 herein, such as one which may be presented to the user on any microprocessor-enabled device having input components and a video display such as an LCD screen or computer screen, such as smart phone, a laptop computer, and desktop computer, or any other device capable of running software and a visual display means in communication therewith. Sounds communicated in combination with personalized objects will be broadcast by speakers or headphones or the like from the connected user device.

The current interface window 12 of the system 10 communicated as a GUI, shows a particularly preferred example of how a user defines a first set of input criteria or non-textual identifiers recognizable only by the user. Preferably, software enabling the system herein, and running on a computer device such as a server, or a smart phone, or a personal computer, employs onboard software adapted to the task of allowing a user to provide input criteria such as text or matching pixilated areas, and associating such into a relational database.

The user will preferably provide and define non-textual identifiers including a plurality of objects 16 into a group of objects 16 each of which are easily recognized by the user when viewed, and sounds 17 easily recognizable by the user, with respective input alphanumeric string or word association 18 combinations. The word associations 18, are input by the user as input strings, such as text and/or numbers. Each input string providing a word association 18 to a respective object 16, or sound 17, is stored in a database and later employed in the identification of objects 16 positioned in the displayed GUI, and/or sounds 17 communicated to the user, to allow the user to input and generate an authentication string or password authentication for a session.

This password or authentication, employing software adapted to the task of receiving the user inputs, and matching such to stored matching correct associations, is compared to a comparative matching authentication string which is assembled by the software by placing each of said input strings stored in said relational database and are associated with a respective object 16, or sound 17 using a current known sequence which is displayed or communicated to the user.

Again, the displayed non textual identifiers such as a picture or drawing or graphic object can be anything renewable in pixels on a display of a GUI which when communicated to the user is identifiable when viewed by the user thereon, and/or a communicated sound any sound easily identified by the user when reproduced on a speaker or headset. Anticipated picture related objects 16 include any one or combination of objects from a group of consisting of pictures, photographs, images, drawings, illustrations, phrases, questions, numbers, alphanumeric characters, colors, colorized alphanumeric characters, and the like. Anticipated sounds 17 used for non textual identifiers, include a mother's voice, a dog's bark, a child talking, and other easily discerned sounds personal to each user.

A key component of the system 10 herein is that the user easily recognizes the non textual identifier of a picture related to object 16 displayed on the GUI, or the sounds 17 communicated to them, and easily discerns or remembers or recognizes a matching input string of letters or numbers or depicted indicia associated with each of the plurality of objects and/or sounds. Additionally, the system may display the user-associated letters or numbers or input alphanumeric strings associated with the objects, as chooseable icons or pixels in a determined pixilated area of the screen depicted randomly or sequentially on the GUI as a clue or means for recognition for the user needing one or as a means to match input to objects or sounds graphically.

The depicted graphic or pictures of input strings will be in positions on the GUI where only the user will recognize and associate or ascertain which input string for a related object matches which recognizable object or depicted indicia. Thereafter, the user can either input the correct string, or can drag and drop or otherwise choose the correct depicted iconic strings or indicia to mate or associate with the appropriate recognized object, or depicted representation matching a sound.

As one current example, there is seen a non textual identifiers of a first object being a picture 20 of a woman. Further, as can be seen the user who recognizes the picture 20 has chosen to associate the word 'sister' 22 with this first object which is the recognized photo of the user's sister and easily remembered by the user but unknown to third parties.

During password or authentication for any session, the user must later remember this match to provide an input string which is the word association 'sister' the user assigned to the photo. Since the picture when displayed in a GUI will have a personal meaning known solely to the user, it will be easily remembered and associated by the user, but not easily discerned by anyone else.

This use of non textual identifiers defined by user-known and recognized objects, indicia relating thereto, or sounds, especially if they relate to someone like a grandmother, girlfriend, or a depiction of a favorite remote vacation spot visited by the user, will make it easy for the user to recognize but very difficult if not impossible for hackers or identity thieves to obtain the user's password. Further, since with each session, the depictions and associated matching inputs change, the authentication employed for a password changes, even if copied by someone looking over the user's shoulder, the string generated at one session will not be the same in a future session.

The user can provide the non textual identifiers as any number of objects 16 or sounds 17, to be stored in the relational database and be later recognized for association with the user's input strings, identifiers, or word associations 18. A very large number of objects 16 and sounds 17, easily recognized and remembered by the user, is an especially good means for rendering the system unhackable, but still easily employed by a user who can easily remember the words or objects presented which are to be associated with any given personal object 16 or broadcast sound 17.

As shown, a second object 16 is shown depicting a number five 24 which may be filled in with a color 26, such as red. The system may comprise a database of such supplemental objects for the user to choose from, aside from the user providing personal images or pictures. To further deter hackers, the user may choose to associate the word 'red' 28 with this object, as opposed to the number 'five', since such a word association may not be obvious to a third party. A sound 17 may also be played for input and identification by the user in between or concurrent with any depiction of an object 16.

A third object 16 is provided having a question 30 depicted by the GUI. The question 30 may be one previously written by the user, or may be chosen from a group of various questions stored in the relational database. In any case, the user will preferably provide such a question 30 which has a word association which is personal or otherwise known solely to that user and easily remembered. In this example the user chose "1999" 32 in a response to be associated with the depicted question 30.

A fourth object 16 is shown as being a colored 36 circle 34 is defined by the user with the word association 18 being 'circle' 38, and in this case the color 36 is provided merely to throw off a hacker or identity thief. Additional objects 16 can be provided, herein shown numbered 14, one through 'n'.

Figure 3:
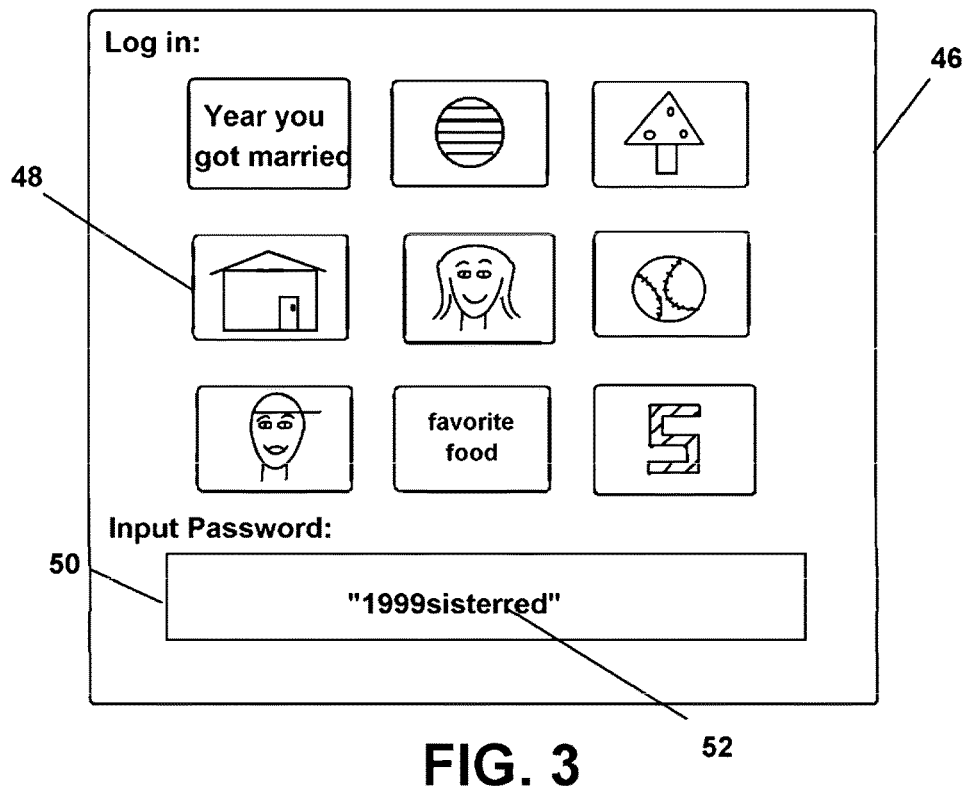
FIG. 3 shows a view of an example dynamic authenticating session, showing a 'log in' screen depicting objects on a displayed GUI having a 3×3 object grid.
Figure 4:
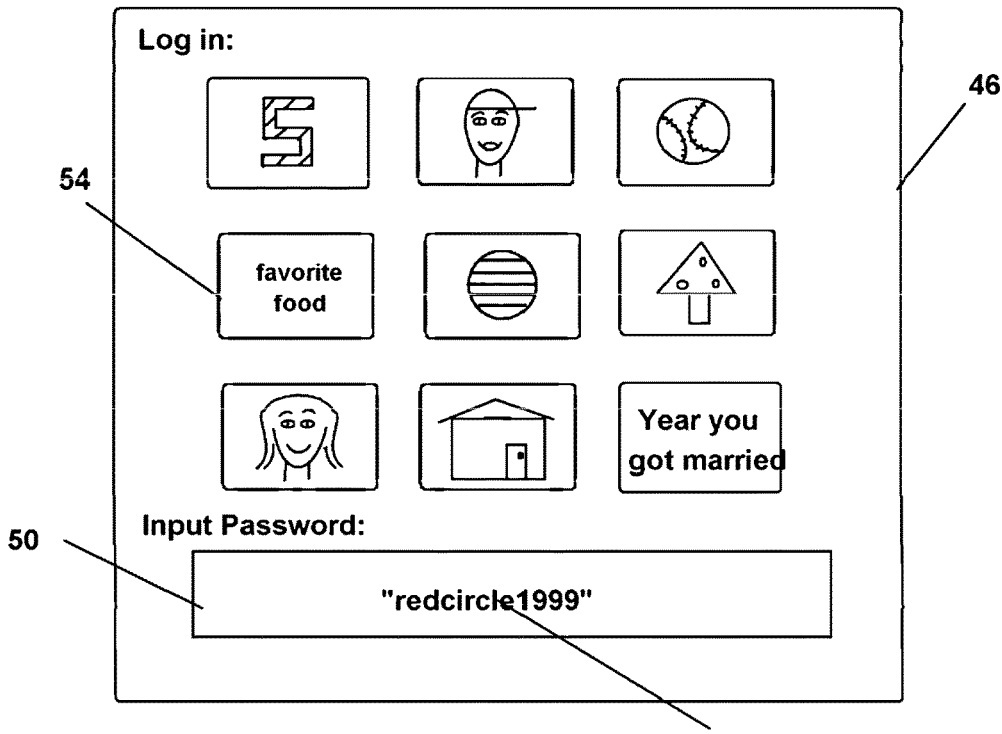
FIG. 4 shows a view of another dynamic authenticating session, showing a 'log in' screen depicted by the displayable GUI having a 3×3 object grid in a different arrangement.

In operative employment, the method and system herein employs software adapted at the task of the random or changing of the positioning of the predefined objects 16 for recognition by the user, on a transmitted and displayed dynamic graphic user interface (GUI) (FIGS. 3 and 4). Again, the dynamic rendering of the objects 16 in the GUI can be in a linear sequence, a grid, or a matrix, or some other means for a displayed sequence positioning, of the predefined objects 16 in the GUI, which has been associated by the user previously and provides an associated input sequence known only to the user. Further, intermixed with the objects 16, sounds may be communicated which are identifiable by the user, and generic sounds. The user will input the known identifier for the sound 17 in combination with the inputs for the objects 16.

It is this displayed authenticating sequential pattern of the objects 16 in the GUI which is then employed by the user to determine the corresponding input sequence for the respective chosen indicia or word associations 18 related to each depicted object 16 in the discerned authenticating sequential pattern. As noted the input authentication string assembled by the user inputting text or code for each respective recognized object 16 and/or sound 17, is compared by the software to a comparative assembled authentication string formed by assembling input strings 18 stored in said relational database which are associated with objects 16 by the user, in the currently transmitted and known proper sequence, based on how the system transmitted the display of the objects 16 and the timing of sounds 17.

If a match occurs, authentication is verified. Those skilled in the art however, will recognize that the more objects 16 provided which are easily recognized and associated by the user, and the more sounds 17 stored which only the user can identify, and the more complex the displayed authenticating sequential pattern of those objects 16 and sounds 17 in the GUI employed for authentication, the more difficult it will be for a hacker or thief to obtain and/or discern the user's password.

Further, in the event that a hacker ascertains the authentication string transmitted as the password for one session, during each subsequent session, the software running the system herein will create a different GUI rendering which generates a different user-discernible authentication string using a different authenticating sequential pattern, and/or plurality of objects 16, and/or sounds 17, which are recognized and associated by the user during later authenticating sessions.

Figure 2:
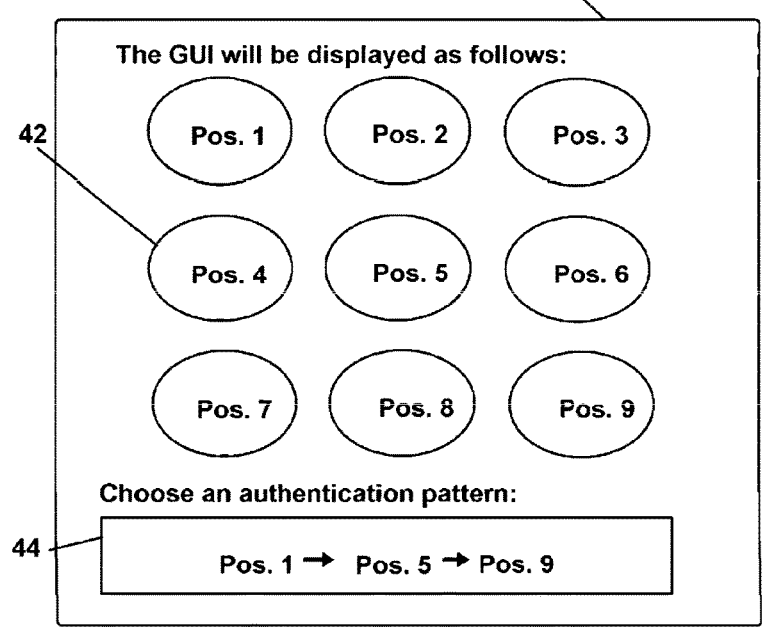
FIG. 2 shows a view of another preferred interface for criteria input for one authentication sequence/pattern.

FIG. 2 shows an example of another user interface window 40 showing a preferred means for inputting the criteria for the displayed authenticating sequential pattern for object selection for determining the password word string. The user may be provided with a sample of the GUI 42, in the current example showing a 3×3 grid, therefor having nine positions employable for the displayed sequential authenticating pattern 44. The authentication pattern 44 chosen by the user, or alternatively provided by the system, will be the displayed authentication pattern 44 in which objects 16, or depictions of other objects 16 representing played sounds 17, are positioned to be identified and associated on the authentication GUI 48, 54 (FIGS. 3 and 4) when attempting an authentication session, commonly referred to as a 'log in'. In this example, the sequentially displayed authentication pattern 44 of the objects 16 and sounds 17 is provided in the sequential pattern of Position-1; Position-5; Position-9. It is noted that the user must remember the displayed authenticating sequential pattern 44 in order to determine the correct sequence for input of the text strings to generate the correct password.

FIG. 3 shows an example authentication session window 46. The system will provide the user with a dynamic GUI 48, currently showing the 3×3 grid with the user's predefined objects 16 and objects 16 or icons representative of playable sounds 17, randomly positioned thereon. Given all previously defined input criteria, the user is able to determine and input a string for the password through the identification of the objects 16 and/or heard sounds 17, corresponding to the predefined display authentication pattern 44. Thereafter, by discerning the associated words 18 to generate input strings, the user can construct a word string 52 from the individual input strings formed by the individual word associations 18 for the objects 16 known, and sounds 17 recognized, and thereby generate the proper password. In the example shown in the figure, the sequentially entered individual word associations 18 combine to input the password word string 52 which is "1999sisterred".

In preferred modes of the method, the customized user GUI 48 may be communicated to the user from a server or computer over a network, such as the internet or a cellular system, in a private or encoded transmission or broadcast, such that it is hidden from a potential hacker.

After an authenticated session, (i.e. after the user has logged in) the user logs out, or shuts off the electronic device. The server or networked computer device running the system will dump the previous password or authentication from memory and create a new one based of a new random positioning of the users defined and associated objects onto the GUI, or the random assignment of code strings to each object 16 or sound 17 to be identified by the user.

FIG. 4 shows another possible authenticating session window 46 having a differently positioned GUI 54. As such, although the input authentication pattern 44 remains unchanged, the positions of the objects 16, or objects 16 which may be representative of sounds 17, are changed, and therefor the identified association by the user generating an input string, or word string defining the proper password will be in different order. In the current example, the new properly input word string 56 is "redcircle1999" which is assembled by the user inputting recognized and associated objects depicted on the screen.

FIG. 5 shows a flow chart representation of a mode of the disclosed method. For security purposes, if the user inadvertently inputs the word associations 18 based on objects 16, and sounds 17, and generates an incorrect word string 56 in the password input bar 50, the system may then reposition the objects 16 representative of things or sounds 17, on the displayed GUI and present the user with a new positioning scheme. For added security, it may be preferred that system only allows the user a certain amount of attempts, such as three attempts, before the system 'locks' the user out, i.e. prevents the user from trying additional attempts. In this event the user may have to wait a certain time period, or may be prompted to identify the objects in another way. For example, an option may be provided wherein all the predefined objects are shown and the user must input all if not a majority of the pre defined word associations in order to authenticate themselves as the user.

FIG. 6 shows a more detailed flow chart of a mode of the method and system herein.

This invention has other applications, potentially, such as gaming) and one skilled in the art can easily discern these after reading this disclosure. The explanation of the features of this invention does not limit the claims of this application, and other applications employing a displayed sequence of objects known to the a user to generate changing input passwords or authentication systems developed by those skilled in the art are intended to be included within the scope of this invention.

Figure 7:
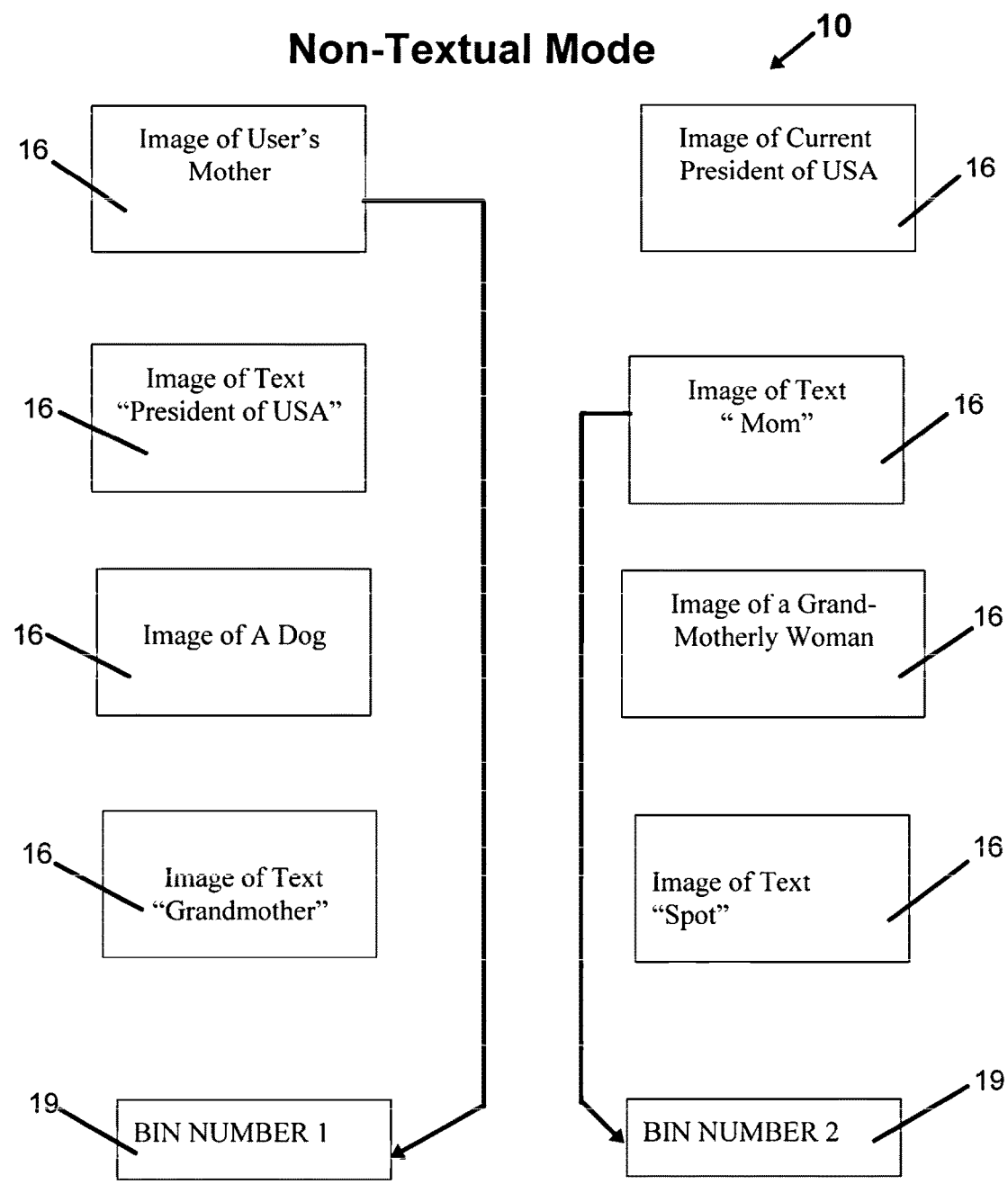
FIG. 7 depicts a non textual mode of the system herein wherein graphic depictions on a display or sounds reproducible through loudspeakers, and pre-known to the user, are mated to graphically depicted icons or matches, and an authentication string generated by software thereafter and no keystrokes are generated which may be transmitted over the network.

FIG. 7 shows a non textual mode of the system herein, wherein graphics of individual objects 16 which may be photos or illustrations, or objects 16 representative of sounds 17 played, which are recognizable and only having a meaning or are pre-known to the user, must be mated by the user to graphics of text, or of another graphically depicted answer, to the known objects 16 on the display or sounds broadcast from speakers. In this mode, no keystrokes need be generated by the user, which must be transmitted across the network, or which might be recorded by malicious software. Further, in this mode, the system can randomly assign code strings or transmittable identifiers, to each object 16 and each sound 17, on each occasion. When the user recognizing objects 16 or sounds 17 uses the GUI to drag and drop the objects 16 representing things or sounds to a proper graphic drag and drop mating, a combination code string is generated by the software from the random code strings assigned to the objects 16 and sounds 17.

Thus, the user using communicated or pre-defined deposit bins or deposit areas 19 positioned and viewable in said GUI, where objects 16 which in this case match images or sounds known to the user, are dragged and dropped. This drag and drop mode, with random numbers or code strings or text strings associated with each object 16 and sound 17 related to a draggable object 16 such as the noted dog next to a microphone, eliminates any need for typing and transmitting of keystrokes generated by the user. Instead, using a mouse or pointer, the user will drag-and-drop "matched" image objects 16 and/or sound 17 related objects 16, from the plurality of objects 16 displayed, to the proper bin or deposit area 19 defined by an area of pixels identified to the software of the system 10 on the communicated and depicted GUI.

As shown, multiple images of people and animals as image objects 16 are depicted in the graphic interface, and multiple sounds 17 may be provided which associate with or mate to displayed sound objects 16. Only the user is familiar with which respective individual items of the plurality of images relating to objects 16 or relating to sounds 17 which are a match to other objects 16 placed on the GUI as a deposit area 19, or which mate to other one or a plurality of image related objects 16 or sound related objects 16 and are to be dragged into a proper deposit area 19.

Figure 8:
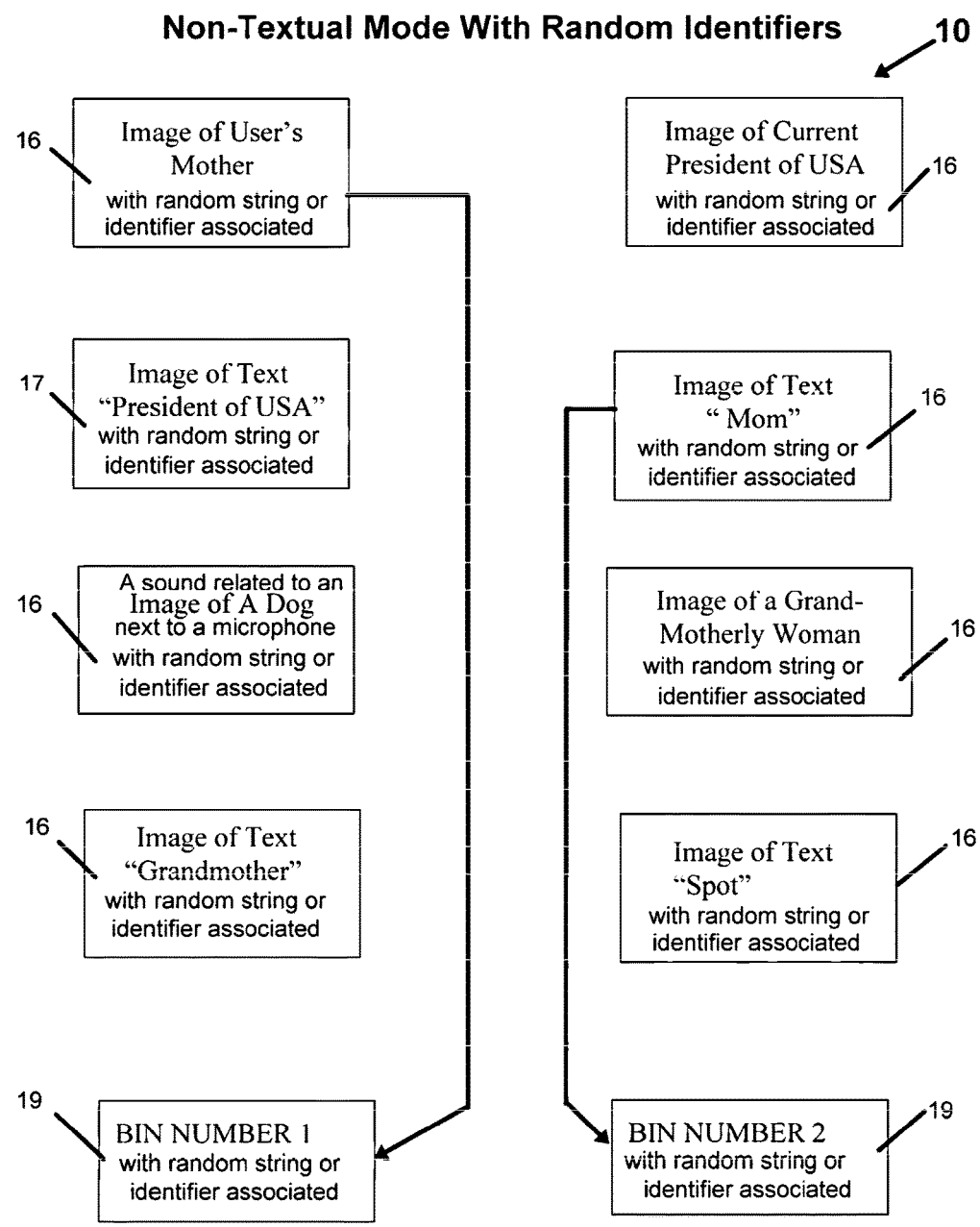
FIG. 8 depicts a non textual mode of the system herein wherein graphic depictions on a display or sounds reproducible through loudspeakers, and pre-known to the user, are mated to random strings or identifiers by the system upon transmission to user.

As shown, in the system 10 depicted in FIG. 7 and FIG. 8 an image being an image related object 16 of the user's mother which is associated with the mother, is dragged into Bin number 1, and an image, depicted as pixels, in a known pixel area of the display forming the GUI, rather than text, of the image "Mom" is dragged into the deposit area 19 of pixels shown as Bin number 2. The bins or deposit areas 19 on the GUI, are pre-coded to have the software running the system 10, to discern an object 16 has been placed in a deposit area 19 and then to communicate an input string from the combination of the random code strings assigned to each of the image object 16 of the mother, and the image object 16 of the text word "Mom." The software generated code string is then communicated to the server on the network, or the software running security on the electronic device, where it is compared with temporarily stored code strings generated as proper, based on the known communication of the GUI to the user, and the known random strings associated with both "mom" and the image 16 of the mother, and determined proper matches of the two. The codes strings generated and communicated in this mode of the system, are always based on the random code strings assigned by the software of the system, to each communicated picture related objects 16 and sound 17 and its related objects 16, and optionally additional random codes assigned to the proper deposit area 19 or bin, on the GUI where the user drags the two objects 16 for a match. This mode of the system 10 shown in FIG. 8, generates random codes or input strings each time the GUI is communicated which are never duplicated on subsequent login sessions. Consequently, hackers and network eavesdroppers will be unable to use any captures input strings since they only occur once and are useless in subsequent logins.

Further, people unfamiliar with the user or the images, or the sounds, or other indicia depictions of course may try to match the imaged word grandmother as the recognizable object, to the one of the depicted women looking like a grand motherly figure, and to match the image of the dog to the image of the text "Spot" which would cause a denial of access since only predefined matching image objects 16 and sound 17 objects 16, as related objects can matched to communicate the correct pair of random code strings or identifiers which are randomly transmitted and which are recognized as an authentication string.

Further, by making the images of people or places or animals or the like and generating sounds, which are well known and immediately recognized to the user, and providing a mating image associated by the user in pixels as a graphic, rather than Ascii text, of the correct answer, only the user will know, the system allows for a customized drag and drop match for access, but, denies access to those who type Ascii text and transmit any text on the keyboard which could be intercepted.

Of course which bin or destination on the GUI, the user is to drag and drop to, and how many of the objects 16 representing images or sound, are supposed to match from the plurality provided, and then be so dragged, would be determined in advance and held in the relational databases as answers the system is looking for. Actions by the user to deposit pixels representing objects 16 into the destination area or bins, are coded in the software running the system, to recognize the associated random string or code with each dropped object 16 and then to transmit the associated code or string which should be identifiable by the software running the system running on a networked server or computer by doing a lookup in a temporarily stored database of correct responses based on the GUI which was transmitted and the random strings or inputs assigned.

A wrongly dragged and dropped object 16 will generate the wrong input code. Further, the proper access codes change each time the GUI is communicated with new codes, strings, or identifiers assigned to each object 16 to be dragged and dropped. It is preferred that a large plurality of images and sounds, known to the user and on file in the database are used along with generic sounds and images, to ensure that new generic and unmatched images and matching images and generic sounds and user known matching sounds, are transmitted at each login.

FIGS. 9-10 depict another typical authentication process of the system 10 herein, wherein the user is presented first with an easily recognized object 21 in a first sequential screen, shown in FIG. 9 which the user may, or may not have to communicate an actual recognition or identification. Since the recognized object in this case is the indicia of a youthful girlfriend "Julie Gomez", the user need only input a communication to depict subsequent implied-object screens shown in the sequence of FIG. 11. Thereafter the user using the graphic interface will communicate a sequence related information in associations, which the user relates to the original recognized object 21 correctly in the sequence of screens.

The associated input related information depicted in the sequential GUI screens, will have been pre-provided by the user, information or relating objects associated with the recognized object 21, which in this case is shown as a prior girlfriend. Shown in sequence, the user has associated that the recognized object was in a first association 23 a related object of a first girlfriend, in a second sequential association 25, a related object of being from a city, in a third association 27 that she was a pianist as another related object, and in a fourth association 29 and related object in the group of related objects to the recognized object 21, during a particular year. Finally, in a final association involving interpretation 31 by the user, the fact he was given a pen, may be chosen to complete the sequence and provide the proper authorization for the user to log on.

As can be seen, a user who has provided the recognized object 21, will easily recognize it subsequently. Further, the associated related objects graphically presented which are provided by the user earlier, are easily remembered as associated with the recognized object 21 when queried by the software running the system 10 herein using sequential GUI's.

Thus, the user can easily and quickly answer the series of associations of facts or related objects with a recognized object 21, which need not be necessarily identified at the outset of authentication. Instead the user can simply communicate they have recognized the recognizable object 21 which will cause the software running the system 10 to communicate the sequential plurality of chooseable related objects in the form of indicia such as photos, graphic text, or other means allowing the user to communicate sequential associated choices to a recognized object 21, to generate an authentication to enter a site or computer or other protected computer or area. Not having to identify the actual recognizable object 21 is an additional means to prevent hacking or circumventing the system 10.

It should be noted the system herein in all modes, may also be employed for login authentication for websites which may use singularly or in combination with a website login, a text-message to a known smartphone or pad computer of the user in question. Such is generally referred to as SMS authentication for web site logins.

More recently, many firms have started providing users the ability, or the requirement, that they receive a single-use password from the website they are trying to enter, using SMS, where this single use password is generated by the system provider in response to a login, or the initiation of a login, to the website. In some cases where financial transactions are to occur which could impact the user's monetary holdings managed through the website, such sites have required users take this two-step login where such a one time SMS-communicated passcode is generated and communicated to the smartphone or pad computer at a phone number known to be owned by the user in question. Once received, this one-time or single-use password, must be entered into the appropriate graphic interface communicated from the website to which the user is attempting a login, to gain access.

Unfortunately, such a text or numerical single-use passcode, once generated, must electronically travel through various computer networks from the computer for the website to be accessed, to the user attempting a login. This network pathway includes a first SMS gateway from the firm generating the single-use code, then to a wholesale SMS gateway where it can follow on through an international SMS network, whereupon it can be communicated to the local cellular phone provider of the user, for wireless broadcast to their phone.

At every juncture along this circuitous electronic pathway, the text and numeral message is subject to hacking and retrieval by parties familiar with the user and their phone number and phone ID, which may easily be cloned to another phone or electronic device which will also receive the single use code for input to gain access to the website of the user. Thus sending a simple text or numerical or other code which is then to be entered into a graphic interface of the site of the user, can be hijacked and entered by anyone receiving it, in any legal or illegal fashion.

Using the system herein, another typical authentication process of the system 10 herein as shown in any of the figures, or as in FIGS. 7-10 for example, rather than communicating over SMS the system-generated alphanumeric characters, to be subsequently input to a graphic interface of the system provider to gain access, instead, the user is presented with a plurality of similar graphic depictions or images to a recognized object 21, along with the recognized object 21. The user then must identify the recognized object 21 by inputting alphanumeric characters relating to or identifying the recognized object 21, to a presented graphic interface as a single use access code. Such would only be known to the user where the depiction of the recognized object 21 is personal to the user, and useless to a hacker.

Alternatively, the user may be provided in an SMS message, with an easily recognized object 21 on the graphic display of their smartphone or pad computer having SMS messaging, along with a graphically depicted message from the website provider, instructing the user to input alphanumeric characters or text relating to the depicted recognizable object or describing one of the first association 23, second sequential association 25, or third association 27, or more input associations, which the user has previously input to the system provider as associated with the easily recognized object. The alphanumeric characters or text to which a current input must be matched, is from previously input information from the user relating to each respective recognizable object.

The user will then be presented with a graphic interface on the website where they are seeking access to input this one or more of the noted associations to gain access. Again, a hacker will be unable to ascertain the recognized objects or any of the previously input associations, and a highjacking of the SMS message in an attempt to gain access to a website will be unsuccessful.

Figure 11:
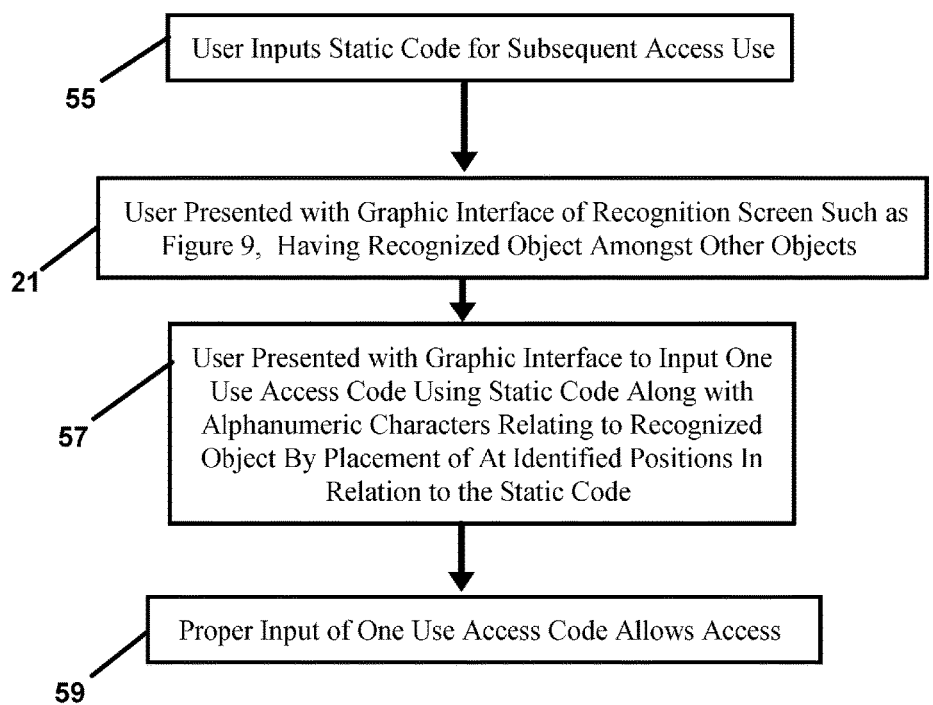
FIG. 11 depicts the system herein employing the previously input user-known not textual identifiers such as recognizable objects, sounds, or indicia, and user input associations to the recognized objects, sounds or indicia, to generate a single use access code.

In another mode of employment of the system herein FIG. 11 depicts the system 10 herein employing the previously input user-known non textual identifiers in the form of recognizable objects, sounds, or indicia, along with user input information associated with each of the recognized objects, sounds or indicia, to generate a single use access code as noted above and shown in FIGS. 7-10. The recognizable object 21 user input information will be entered by the user using a communicated graphic interface relating to each recognizable object, wherein the user can enter alphanumeric characters as information relating to the respective recognizable object. The information is saved for later use in a combination with a static code input by the user as noted below.

This mode is well adapted to generate easily discerned single-use passcode or user input authentication to enter a site or computer or other protected computer or area. As shown in FIG. 10 the user will be provided with a graphic interface to input a user static code 55, which will be employed subsequently to generate single use passcodes providing authorization to enter the protected website, computer, or network.

Thereafter, when trying to login, and being directed to generate a password string 52 providing authorization to enter the site or computer or network or other protected area, the user will be presented with the graphic interface screen such as in FIG. 9, which includes the recognized object 21 along with others which may look similar but are unrelated.

Using the viewed graphic interface which includes the recognized object 21, the user is presented with a graphic interface to input a one use access code 57 which is a combination of their previously entered static code 55, plus alphanumeric characters such as text or numbers, from the previously input information relating to the respective recognized object 21. Such is shown in FIGS. 9 and 10 where the recognized object 21 is a graphic depiction of Julie Gomez who is known to the user, and input information relating to the recognized object from the user is shown as screen 1, screen 2 etc. The user inputs this information relating to either the recognized object 21 itself, or the alphanumeric characters the user previously input relating to the respective recognized object 21 which are stored in electronic memory. The user input in the position provided on the GUI, generates an alphanumeric string including the static code and user input information, in an attempt to generate an access code.

Software running on the computer of the system 10, thereafter generates a comparative authentication string from said input alphanumeric characters in the combination with the static code. The system authenticates the user if this comparative authentication string is determined by said software to have a match between said alphanumeric characters in said combination with said static code.

This authentication of course will use the input alphanumeric information concerning the recognized object, in the requested combination with the static code, to ascertain if the proper alphanumeric character information was input in the proper position and order relative to the static code.

In many cases, as shown in FIGS. 11-12, the user will be directed to position only some letters or numbers from the alphanumeric information input by the user, in a combination with the static code. The system may also provide in the GUI for input of these letters and the static code, directions concerning which letters to use from the information stored about the recognized object, and in what positions relative to the start end of the static code, to position those letters. Generation of a proper access code 59 provides the authorization to enter the site.

In an example of this mode of generation of authentication to enter a protected site or computer or device, shown in FIG. 12, a single use access code would be generated by a user employing the system per FIG. 11. As seen in FIG. 12, the user has previously input a static code of "an031058", which is known only to the user.

Upon a subsequent login, the user may be provided with a graphic interface requesting entry of the static code along with additional characters or numbers relating to the stored information input by the user concerning the recognized object 21, into a window in the graphic interface, as a single use passcode for entry authorization. The user can be provided in the graphic interface instructions to enter and alter the static code, using letters or numbers relating to the recognized object.

In this case, using direction 2 in the example, the user enters the static code, along with the first two letters from the recognized object 21, into the area provided on the graphic interface. With "Julie Gomez" being the recognized object 21, the first two letters would be "ju." Thus the entry by the user into the provided area of the static code with the additional letters "ju" at the end of the static code, would authenticate the user to enter. Of course, only the user would know the letters to add per the direction of the graphic interface, since only the user recognizes Julie Gomez as the recognized object 21, and as such only the user would know to enter the appropriate letters from the recognized object in the position on the static code directed.

This mode of the system 10 of course can be employed with any other steps in the system 10. However, it is especially well employed for security where the input for authorization to enter for the user, is handled over SMS messaging. This is because only images are sent to the user, one of which they must discern as a recognized objection which would only be known to them, before entering the input requested relating to the recognized object on a provided graphic interface. Hackers would not be able to discern what the recognized object is, nor enter the correct alphanumeric characters, even if for some reason the static code of the user was hacked. Thus the system 10 in the mode of FIGS. 11-12 as well as in other modes of the system 10 noted herein, is especially well adapted to such SMS authentication as part of generating authorized access for the user to a computer, network, website, or other site accessed over a network.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed:

1. A method for generating a changing authentication input or password required for a user in an access attempt for accessing a computing device such as a smartphone or server over a network, where said computing device is in operative communication with both a display capable of rendering objects in a Graphic User Interface (GUI) and an alphanumeric input component such as a keyboard, and running software adapted for operation and the steps of:

communicating to said user, a GUI for input of a static code for and storing said static code in electronic memory as a stored static code;

communicating a GUI to said user for inputting of recognizable objects to be depicted amongst said objects;

storing said recognizable objects input by said user in electronic memory as uploaded recognizable objects;

having said user employ said input component to communicate alphanumeric characters associated to each respective uploaded recognizable object;

storing said alphanumeric characters communicated from said user in electronic memory as inputted alphanumeric characters which are associated with each said uploaded recognizable object, in a relational database;

upon an access attempt to said computing device, communicating a said GUI displaying at least one said uploaded recognizable object as at least one recognizable object depicted in a group of depicted said objects;

communicating a said GUI directing said user to input alphanumeric characters identifying said at least one recognizable object, having said user communicate a current input of said static code;

generating an alphanumeric string from a combination of said alphanumeric characters input as identifying said at least one recognizable object in a combination with said current input of said static code input by said user;

generating a comparative authentication string from said inputted alphanumeric characters stored in electronic memory which are associated with said uploaded recognizable object depicted as said at least one recognizable object, in combination with said stored static code; and authenticating said user if said comparative authentication string is determined to have a match with said alphanumeric string whereby access security for users of computers, websites and servers is enhanced by generation of different alphanumeric strings which must match differently generated comparative authentication strings, with each access attempt.

2. The method for generating a changing proper authentication input or password of claim 1, wherein said step of communicating said GUI displaying at least one said recognizable object in a group of depicted objects is communicated by SMS messaging.

3. The method for generating a changing proper authentication input or password of claim 1 additionally comprising the steps of:

allowing said user to provide some or all of said uploaded recognizable objects using graphically displayable renderings associated with familiar objects comprised of people, places, things, or sounds, known to said user, and employing said familiar objects as said at least one recognizable object, whereby said at least one recognizable object is only discernable by said user.

4. The method for generating a changing proper authentication input or password of claim 2 additionally comprising the steps of:

allowing said user to provide some or all of said uploaded recognizable objects using graphically displayable renderings associated with familiar objects comprised of people, places, things, or sounds, known to said user, and employing said familiar objects as said at least one recognizable object, whereby said at least one recognizable object is only discernable by said user.

5. The method for generating a changing proper authentication input or password of claim 1 additionally comprising the steps of:

changing said at least one recognizable object in said group of depicted objects, for each successive said access attempt by said user.

6. The method for generating a changing proper authentication input or password of claim 2 additionally comprising the steps of:

changing said at least one recognizable object in said group of depicted objects, for each successive said access attempt by said user.

7. The method for generating a changing proper authentication input or password of claim 3 additionally comprising the steps of:

changing said at least one recognizable object in said group of depicted objects, for each successive said access attempt by said user.

8. The method for generating a changing proper authentication input or password of claim 4 additionally comprising the steps of:

changing said at least one recognizable object in said group of depicted objects, for each successive said access attempt by said user.

9. The method for generating a changing proper authentication input or password of claim 1, additionally comprising the steps of:

said GUI directing said user to input alphanumeric characters relating to said recognizable object directing said user to input only some of said inputted alphanumeric characters input by said user previously.

10. The method for generating a changing proper authentication input or password of claim 1, additionally comprising the steps of:

communicating said GUI directing said user to input alphanumeric characters relating to said at least one recognizable object in a combination with said current input of said static code along with depicted directions to position said alphanumeric characters in a certain position relative to said current input of said static code.

11. The method for generating a changing proper authentication input or password of claim 2, additionally comprising the steps of:

communicating said GUI directing said user to input alphanumeric characters relating to said at least one recognizable object in a combination with said current input of said static code along with depicted directions to position said alphanumeric characters in a certain position relative to said current input of said static code.

12. The method for generating a changing proper authentication input or password of claim 3, additionally comprising the steps of:

communicating said GUI directing said user to input alphanumeric characters relating to said at least one recognizable object in a combination with said current input of said static code along with depicted directions to position said alphanumeric characters in a certain position relative to said current input of said static code.

13. The method for generating a changing proper authentication input or password of claim 9, additionally comprising the steps of:

communicating said GUI directing said user to input alphanumeric characters relating to said at least one recognizable object in a combination with said current input of said static code along with depicted directions to position said alphanumeric characters in a certain position relative to said current static code.

* * * * *